(12) United States Patent
Ferber et al.

(10) Patent No.: US 6,850,331 B1
(45) Date of Patent: Feb. 1, 2005

(54) METHOD FOR DETERMINING MEASURING POSITIONS AND METHOD FOR PLANNING MEASURING TRACKS FOR MEASURING AN OBJECT OR A PART THEREOF AND DEVICE FOR MEASURING AN OBJECT OR A PART THEREOF

(75) Inventors: Stefan Ferber, Kronberg (DE); Andreas Zilker, Bibertal (DE)

(73) Assignee: DaimlerChrysler AG, Stuttgart (DE)

( * ) Notice: Subject to any disclaimer, the term of this patent is extended or adjusted under 35 U.S.C. 154(b) by 373 days.

(21) Appl. No.: 10/110,954

(22) PCT Filed: Nov. 21, 2000

(86) PCT No.: PCT/DE00/04107

§ 371 (c)(1),
(2), (4) Date: Apr. 17, 2002

(87) PCT Pub. No.: WO01/40734

PCT Pub. Date: Jun. 7, 2001

(30) Foreign Application Priority Data

Nov. 29, 1999 (DE) .......................................... 199 57 366

(51) Int. Cl.$^7$ ............................................. G01B 11/24
(52) U.S. Cl. ........................ 356/603; 356/601; 356/614
(58) Field of Search ................................ 356/601–624, 356/4.01; 250/483.1; 382/199, 203, 131; 364/518

(56) References Cited

U.S. PATENT DOCUMENTS

| 4,806,777 A | | 2/1989 | Ulbers et al. ................ 250/560 |
| 4,878,247 A | * | 10/1989 | Wester-Ebbinghaus et al. .. 382/113 |
| 4,879,664 A | * | 11/1989 | Suyama et al. .............. 700/186 |
| 4,928,175 A | | 5/1990 | Haggren ..................... 358/108 |
| 5,506,682 A | | 4/1996 | Pryor .......................... 356/375 |
| 5,748,505 A | * | 5/1998 | Greer .......................... 702/104 |
| 5,757,472 A | * | 5/1998 | Wangler et al. ............. 356/4.01 |
| 5,761,332 A | * | 6/1998 | Wischmann et al. ........ 382/131 |
| 5,862,252 A | | 1/1999 | Yamamoto et al. ......... 382/154 |
| 6,154,713 A | | 11/2000 | Peter et al. .................... 702/95 |
| 6,396,952 B1 | * | 5/2002 | Horikawa et al. .......... 382/203 |
| 6,542,249 B1 | * | 4/2003 | Kofman et al. ............. 356/601 |
| 6,690,827 B1 | * | 2/2004 | Horikawa et al. .......... 382/203 |
| 6,717,683 B1 | * | 4/2004 | Wakashiro et al. ......... 356/614 |

FOREIGN PATENT DOCUMENTS

| DE | 40 06 949 | 9/1991 |
| DE | 41 11 043 | 10/1991 |
| DE | 4123955 | 1/1993 |
| DE | 197 12 029 | 9/1998 |
| GB | 22 44 151 | 11/1991 |

OTHER PUBLICATIONS

Glaschke, T.: "Schnelle 3D–Digitalisierung" in: Spektrum, Nr. 74 (Feb. 1999), p. 10.

* cited by examiner

Primary Examiner—Gregory J. Toatley, Jr.
Assistant Examiner—Sang H. Nguyen
(74) Attorney, Agent, or Firm—Davidson, Davidson & Kappel, LLC

(57) ABSTRACT

A method for determining measuring positions and a method for planning measuring tracks in order to measure an object or a part of an object. Also, a method and a device for measuring an object or a part of an object wherein a triangular surface of an object to be measured is calculated from a plurality of reference points and a measuring position is assigned to each triangle at defined intervals. Said measuring positions are arranged around a support point in a zigzag fashion to form a suitable measuring track. Said measuring track is traversed during the measurement. A device used to determine said measuring positions and to plan said measuring tracks enables the track to be traversed.

18 Claims, 2 Drawing Sheets

METHOD FOR DETERMINING MEASURING POSITIONS AND METHOD FOR PLANNING MEASURING TRACKS FOR MEASURING AN OBJECT OR A PART THEREOF AND DEVICE FOR MEASURING AN OBJECT OR A PART THEREOF

BACKGROUND

The present invention relates to a method for determining measuring positions and to a method for planning measuring tracks as well as to a method for measuring an object or a part thereof, and to a device for measuring an object or a part thereof. A method of that kind for determining measuring positions is already known from Thorsten Glaschke, "Schnelle 3D-Digitalisierung" Fast 3D Digitization], Spektrum No. 74, p. 10, 1999, (the "Glaschke article"). A method of that kind and a device of that kind for measuring an object or a part thereof are already known from the Glaschke article as well.

Surface measurement via optical measuring systems, in particular using active vision systems, is gaining more and more importance in industry. For quality assurance and in reverse engineering, tactile 3D coordinate measuring machines have already been used for a long time. Tactile measuring systems offer active measurement strategies for standard measuring tasks (for example, the measurement of bore holes).

Active measurement provides for automatic, fast and collision-free measuring. Moreover, by taking into account the technical boundary conditions of a sensor during active measurement (for example, measuring volume, measuring angle), the quality of a measurement is ensured even if a semi-skilled worker and not an experienced measuring engineer carries out the measurement.

Optical sensors can perform measurements much faster and be used closer to the manufacture than tactile measuring techniques which is why they are becoming more and more widespread. For reverse engineering in vehicle design, optical sensors have frequently already replaced the tactile measuring technology. There, physical 1:5 or 1:1 models of vehicle bodies are digitized to make available the data required for the design in CAD systems, for virtual reality applications or for rapid prototyping. However, active measurement using optical sensors is not yet in use.

An essential requirement for active measurement is the automatic determination of optical measuring positions.

An active measuring system based on a laser triangulation sensor which is positioned via a coordinate measuring machine has already been proposed in the Glaschke article. In this connection, first of all, the total measuring volume of the object to be measured must be entered by the operator; then, the measuring system carries out a rough measurement which is used for determining suitable measuring positions and for planning the measuring tracks for the actual measurement. No details are given on the implementation of this planning. Subsequently, the laser triangulation sensor is positioned via the coordinate measuring machine and the measurement of the object to be measured is carried out. This measuring system needs a high-precision and expensive positioning unit and is therefore only used in air-conditioned measuring rooms.

As a general principle, the determination of measuring positions and the planning of measuring tracks for active object measurement requires a priori knowledge. A suitable set of suitable sensor positions is to be determined from a set of known reference points on the surface of the object to be measured. In the object measuring technique set forth in the Glaschke article, the reference points are determined via the rough measurement preceding the actual measurement. No information can be gathered from the Glaschke article on how to determine suitable sensor positions (measuring positions) and on how to plan a suitable sequence of approaching these sensor positions based on the knowledge of the reference points.

SUMMARY OF THE INVENTION

Therefore, it is an object of the present invention to specify a method for determining measuring positions and a method for planning measuring tracks for measuring an object or a part thereof as well as a method and a device for measuring an object or a part thereof.

The present invention provides a method for performing measurements on an object. The method includes the steps of providing a first representation of a surface of the object as a set of first reference points, triangulating the reference points so as to create a plurality of surface triangles, and assigning a measuring position to each of the plurality of surface triangles. Each measuring position is a defined distance from a centroid of each surface triangle in a direction normal to the surface triangle. The invention also provides advantageous embodiments and refinements of the method according to the present invention.

The method provided for performing measurements includes determining measuring positions for measuring an object or a part thereof. With regard to that method, the objective is achieved according to the present invention in that initially, a first representation of the surface of the object to be measured or of the part to be measured is made available which is composed of a set of reference points, in that then, a triangulated surface is computed by triangulation of the reference points, in that then, each surface triangle is assigned a measuring position outside the object to be measured, the measuring position having a defined distance from the centroid of this surface triangle in a direction normal to the surface of the surface triangle.

As a general principle, the determination of measuring positions requires a priori knowledge about the object to be measured, for example, the preselection of reference points. These reference points can be provided via a rough measurement of the object to be measured preceding the actual measurement. The triangulation of the reference points yields a second representation of the surface, each surface triangle representing the corresponding part of the surface. The assignment of a measuring position in a position normal to and above the centroid of the triangle guarantees that all marginal regions of the triangle are measured with the same quality. The preselection of a defined distance permits optimum adaptation of the measuring sensor to the measuring task or of the distance to the measuring sensor.

Using this method, it is possible for the measuring positions to be determined globally, that is, for the whole measurement. This corresponds to an open-loop controlled method.

In an advantageous embodiment of the method according to the present invention, the measuring positions are determined incrementally, that is, the originally determined measuring positions are optimized during the measurement. This corresponds to a closed-loop controlled method.

The incremental optimization of the measuring positions is carried out in such a manner that an object measurement is carried out from a preselected measuring position for a part of the object to be measured which can be captured from there, the object measurement refining the first representation of the surface, that a refined triangulated surface of the refined representation of the surface is computed, that new measuring positions are determined on the basis of the refined surface triangles.

In this manner, it is also possible to measure surface details in an optimum manner which could have been measured from one of the originally determined measuring positions only with poor measurement quality.

In a particularly advantageous embodiment of the incremental optimization, new measuring positions are determined only for the refined surface triangles whose surface normal deviates from the surface normal of the original surface triangle by more than a defined limiting value.

This method step can easily be illustrated with the example of an outside mirror on a vehicle. Let us assume that a triangulated surface of the vehicle was computed from the original set of reference points, the triangulated surface, at the position of the outside mirror, featuring a single surface triangle to whose surface normal the main axis of the outside mirror runs approximately parallel. The outside mirror virtually protrudes from this surface triangle. It is easy to comprehend that parts of the outside mirror can only be measured with poor measurement quality from the measuring position which is assigned to this surface triangle. The surface normals of part of the refined surface triangles differ strongly from the surface normal of the original surface triangle. Therefore, it is useful to determine new measuring positions for these refined surface triangles.

At the same time, it is guaranteed that no unnecessarily large number of measuring positions are determined or approached during a later measurement. Unnecessary computational outlay and an unnecessary increase in the measurement duration are avoided in this manner.

In an advantageous embodiment of the method according to the present invention for determining measuring positions, a reduced number of new measuring positions is computed from a plurality of neighboring measuring positions, and these new measuring positions replace the plurality of original measuring positions, if the total area of the surface triangles appertaining to a new measuring position does not exceed a defined limiting value, and if the directions of the normal vectors of the surface triangles appertaining to a new measuring position do not differ from each other by more than a defined limiting value.

In this manner, it is guaranteed that no unnecessarily large number of determined measuring positions are actually approached during the later measurement. Unnecessary computational outlay and an unnecessary increase in the measurement duration are avoided in this manner.

In a particularly advantageous embodiment of the reduction of a plurality of neighboring measuring positions, the limiting value of the total area of the surface triangles appertaining to a new measuring position is determined as a function of the vision field of a measuring system used for measuring the object and/or the limiting value of the deviation of the directions of the normal vectors of the surface triangles appertaining to a new measuring position is determined as a function of a desired measuring accuracy of the measuring system.

The criterion of maximum total area guarantees, for example, that the measuring sensor of the used measuring system can, in fact, completely capture, from a new measuring position, all appertaining surface triangles or that it can meet a specified measurement quality. The criterion of maximum deviation of the normal vectors guarantees that the direction of view of the sensor does not deviate too strongly from the surface normal of a triangle as a result of which the measurement quality would decrease.

In a special expedient embodiment of the method according to the present invention for determining measuring positions, a horizontal shift of the measuring position is carried out which is directed toward the outside, "outside" being defined with respect to the object to be measured if the parallel projection of a measuring position onto a horizontal plane lies within the parallel projection of the object to be measured onto the horizontal plane, and the distance between the parallel projection of the measuring position and the border of the parallel projection of the object to be measured exceeds a defined limiting value.

This special embodiment guarantees the attainability of measuring positions even in the case that the measuring sensor cannot reach certain regions, for example, above an object to be measured.

In a particularly advantageous embodiment of the horizontal shift of the measuring position, this shift is carried out in such a manner that initially, the direction and the length of a first vector are computed, the first vector being defined by a starting point which is determined by the parallel projection of the measuring position onto the horizontal plane, and by an end point which is determined by a point which is situated on the border of the parallel projection of the object to be measured onto the horizontal plane and which has minimum distance from the starting point, and that then, the measuring position is shifted horizontally by a second vector whose direction is identical to that of the first vector, and whose length is equal to the difference between the limiting value of the distance of the parallel projections and the length of the first vector, and that then, this measuring position is substituted by the new, horizontally shifted measuring position.

This particular embodiment guarantees the attainability of measuring positions and, at the same time, ensures that the magnitude of the shift of a measuring position is minimal (namely identical to the mentioned difference). In this manner, the quality loss resulting from the measurement from the shifted measuring position compared to the original measuring position that cannot be reached is minimized as well.

In a further expedient embodiment of the method according to the present invention for determining measuring positions, the set of reference points is determined photogrammetrically, preferably on the basis of measuring marks which can be placed on the object to be measured and measured photogrammetrically.

In particular, large objects such as vehicles are frequently measured photogrammetrically. The sensors used in this context cannot capture the whole object during a single measurement but the overall measurement is usually composed of several dozens to hundreds of individual measurements. In the process, the individual measurements are combined with the assistance of the knowledge of measuring marks which are placed on the object in a uniformly distributed manner prior to the measurement. The positions thereof are determined prior to the actual measurement, for example, photogrammetrically as well. Besides this function, the positions of the measuring marks can also be used as reference points for a method for determining measuring positions for the precision measurement. The uniform distribution of the measuring marks ensures a suitable representation of the surface of the object to be measured via the so-defined reference points.

With regard to the method to be provided for planning measuring tracks for measuring an object or a part thereof, the present invention provides that a set of measuring marks is measured, an auxiliary point situated below an outside surface of the object is determined, a semi-ellipsoid circumscribing the object and having a vertex vertically above the auxiliary point is defined, and a plurality of measuring positions are arranged around the auxiliary point and on the surface of the semi-ellipsoid so as to form a meander-shaped measuring track.

With regard to the method to be provided for planning measuring tracks for measuring an object or a part thereof, the objective is achieved according to the present invention in that initially, a set of measuring positions is made available, in that a fictitious auxiliary point is determined which is situated inside or below the object to be measured, in that a fictitious semi-ellipsoid is defined which circumscribes the object to be measured and whose vertex is situated vertically above the auxiliary point, in that the measuring positions are arranged around the auxiliary point in such a manner that, starting from a first measuring position, a meander-shaped measuring track running upward and downward is formed by the measuring positions in such a manner that the measuring track essentially runs around the surface of the semi-ellipsoid.

An optimum planning of the measuring tracks, i.e. the sequence the of measuring positions to be approached, with regard to the attainability of the measuring positions corresponds to the known representative problem which cannot be solved within acceptable periods of time. Using the meander path running around the object, thus, a suboptimal approach is chosen which yields a measuring track containing all measuring positions in a nearly ideal sequence without requiring much time.

The measuring positions have a defined distance from the surface of the object to be measured. Therefore, the measuring track runs essentially on the surface of a fictitious body which circumscribes the object in a suitable fashion, a body shape being suitable if the distance of its surface from that of the object to be measured corresponds on average approximately to that of the defined distance. A simple object having uniform main axes, such as a cuboid, is circumscribed by a hemisphere in a suitable manner. A usual object having non-uniform main axes, such as a vehicle, is circumscribed by a semi-ellipsoid in a suitable manner.

The measuring track runs on the surface of the fictitious semi-ellipsoid only essentially and not really since the measuring positions have a defined distance from the (representation of) the surface of the object to be measured. Therefore, the measuring positions (and thus, the appertaining part of the measuring track) can be situated both inside and outside the fictitious semi-ellipsoid. In reality, only the central projection of the measuring track which is related to the auxiliary point runs on the surface of the fictitious semi-ellipsoid.

The measuring track starts at a first measuring position which, for example, is situated closest to a defined zero position of the sensor, or which can be reached most easily or quickly from an arbitrary position of the sensor at the beginning of the measurement.

In an advantageous embodiment of the method according to the present invention for planning measuring tracks, a set of measuring positions is made available which were determined according to one of the above described methods for determining measuring positions. The advantage lies in the simple and fast determination of the measuring positions and thus, in that they are quickly made available for the method for planning measuring tracks.

In a further expedient embodiment of the method according to the present invention for planning measuring tracks, fictitious auxiliary point P is calculated as $$P = \frac{1}{N}\sum_{i=1}^{N}(c_i - rn_i)$$

where N is equal to the number of measuring positions,
$c_i$ is the centroid of the $i^{th}$ surface triangle,
$n_i$ is the normal vector of the $i^{th}$ surface triangle,
r is a positive scalar.

The term $c_i - rn_i$ defines, for each surface triangle, a point which is situated at a distance r from centroid $c_i$ of the triangle in a direction parallel to the surface thereof. The point is situated behind the triangle inside or below the object to be measured. The averaging of all these points yields auxiliary point P which is situated approximately centrally inside or below the object to be measured. The measuring positions above the surface triangles can be arranged around such a central point P in a simple manner, for example, by defining a fictitious semi-ellipsoid starting from point P and arranging the measuring positions in such a manner that their projections onto the surface of the semi-ellipsoid run around the object in a meander form.

The invention also provides a method including the step of performing measurements on the object using a measuring sensor from each of the measuring positions.

With regard to the method to be provided for measuring an object or a part thereof, the objective is achieved according to the present invention in that a measuring sensor measures the object to be measured or the part to be measured thereof from different measuring positions, the measuring positions being determined according to one of the above described methods for determining measuring positions.

With regard to the method to be provided for measuring an object or a part thereof, another means for attaining the object according to the present invention consists in that a measuring sensor measures the object to be measured or the part to be measured thereof from different measuring positions, a measuring track along which the measuring positions are approached being planned.

The present invention also provides an apparatus for performing measurements on an object. The apparatus includes a measuring sensor, a device configured to determine a first representation of a surface of the object as a set of reference points, to triangulate the reference points so as to create a plurality of surface triangles, and to assign a measuring position to each surface triangle a defined distance from a centroid of the surface triangle and in a direction normal to the surface triangle. The apparatus also includes a measuring sensor positioning device configured to position the measuring sensor at a plurality of measuring positions.

With regard to the device to be provided for measuring an object or a part thereof, the object is achieved according to the present invention in that the device includes a measuring sensor 21 and a device 22 for positioning the measuring sensor at different measuring positions 13 and, in addition, a device 23 for determining the measuring positions according to one of the above described methods for determining measuring positions.

With regard to the device to be provided for measuring an object or a part thereof, another means for attaining the object according to the present invention consists in that the device includes a measuring sensor 21 and a device 22 for positioning the measuring sensor at different measuring positions 13 and, in addition, a device 24 for planning a measuring track along which the measuring positions 13 are approached according to one of the above described methods for planning measuring positions.

The time efficiency and thus, the economic efficiency of the methods and devices for measuring an object or a part thereof are high because of the favorable determination of the measuring positions and planning of the measuring tracks.

BRIEF DESCRIPTION OF THE DRAWINGS

In the following, the methods and the device according to the present invention will be explained in greater detail in the light of an exemplary embodiment and with reference to FIGS. 1 through 5 of the drawings. In this context.

DETAILED DESCRIPTION

A large object such as a vehicle cannot be measured using the measuring system set forth in the Glaschke article since sufficiently precise positioning systems for measuring spaces of such dimensions are not available at acceptable cost.

When using measuring marks and a photogrammetric measuring technique and system according to the principle of stripe projection, this limitation of the measuring volume does not apply. A required stripe-projection sensor 21 can be positioned using a mobile robot 22. The robot is composed of a mobile platform having three degrees of freedom and of an arm structure having four degrees of freedom. The redundant degree of freedom with a jib permits the measurement of the engine hood and the roof of the vehicle which would otherwise not be attainable.

In such a system, the used coordinate systems (of the robot 22, of the measuring sensor 21 and of the object 1) can, at the same time, be transformed into each other in a particularly easy manner. This matching of the coordinate systems via photogrammetric measurement is carried out at the beginning of the overall measurement and is updated after each individual measurement. This ensures reliable knowledge of the different positions in a uniform coordinate system. Otherwise, measuring errors could occur if, for example because of wheel slip of the robot, its current position in the object coordinate system derived from the original coordinate transformation deviates from its actual current position in this coordinate system.

Figure 1:
FIG. 1 is a representation of the surface of a vehicle to be measured by a set of reference points (determined from the positions of measuring marks placed on the real surface).

For the complete photogrammetric measurement of the vehicle, approximately 150 to 200 individual measurements are required. Measuring marks are placed on the surface of the vehicle 10 for the navigation of the measuring sensor and to be able to combine the individual measurements. Their positions are measured photogrammetrically and form a set of reference points 11 as are depicted in FIG. 1. By triangulation of these reference points, a triangulated surface of the vehicle is computed. Subsequently, a measuring position 13 is computed for each surface triangle 12. The triangulated surface and the measuring positions 13 are depicted in FIG. 2.

The calculation of the measuring positions is carried out in such a manner that, first of all, each surface triangle 12 is assigned a measuring position 13 which has a sensor working distance of 1 m from the centroid 14 of the triangle. The distance is measured in a direction normal to the triangle surface.

Usually, about 500 measuring positions ensue for the example of a vehicle depicted in FIG. 1.

Figure 2:
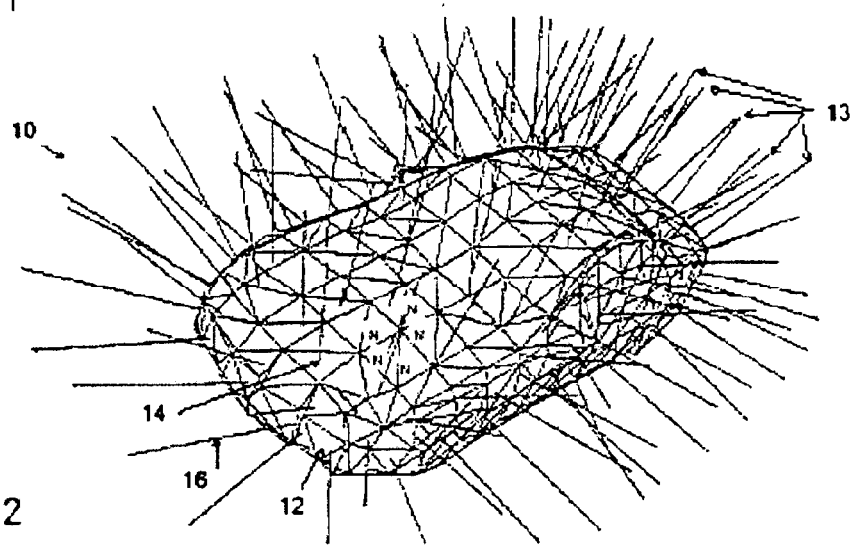
FIG. 2 depicts the triangulated surface of a vehicle, computed by triangulation of reference points. The outer ends of the depicted "spines" indicate the measuring position which is assigned to each surface triangle.

If the surface triangles 12 lie close together, such as the exemplary group of neighboring triangles N shown in FIG. 2, and their normal vectors 16 are nearly parallel, then it is possible for their surfaces to be measured from a common measuring position without thereby causing significant losses in quality. Therefore, average measuring positions are computed which replace the measuring positions assigned to these triangles if, first of all, all triangles still lie within the field of view of a new measuring position (since the acceptance angle of the sensor is limited to a deviation of 15° from the direction of view) and, secondly, if the surface normals of all triangles deviate a deviation of less than 30° from the direction of view of the measuring sensor.

For the sake of simplicity, the known acceptance angle and distance of the measuring sensor are taken into account when checking the first criterion and therefore, it is only checked whether the total area of the respective neighboring triangles N does not exceed a limiting value resulting therefrom.

Likewise, when checking the second criterion, only the deviation of the surface normals 16 of the respective neighboring triangles N among each other is checked. If these do not vary by more than a certain limiting value, then their average value does not deviate from the direction of view of the measuring sensor 21 by more than this limiting value either, the limiting value being determined as a function of the required measuring accuracy.

By applying these criteria, the exemplarily mentioned approximately 500 measuring positions can be reduced to about 150 necessary measuring positions without resulting in significant losses in quality of the measurement.

For the actual measurement, the measuring sensor 21 needs to be positioned in one of the determined measuring positions via the robot 22. However, the robot 22 has a range which is limited by its position. Thus, measuring positions 13 which are situated above the vehicle roof can only be reached within a certain range near the edge of the vehicle. Measuring positions 13 which are situated further inside cannot be reached even when the horizontal robot arm is extended to its maximum. Therefore, it is required for such unattainable measuring positions 13 to be shifted outward to shifted measuring positions 13'. This principle is illustrated by FIG. 3.

Figure 3:
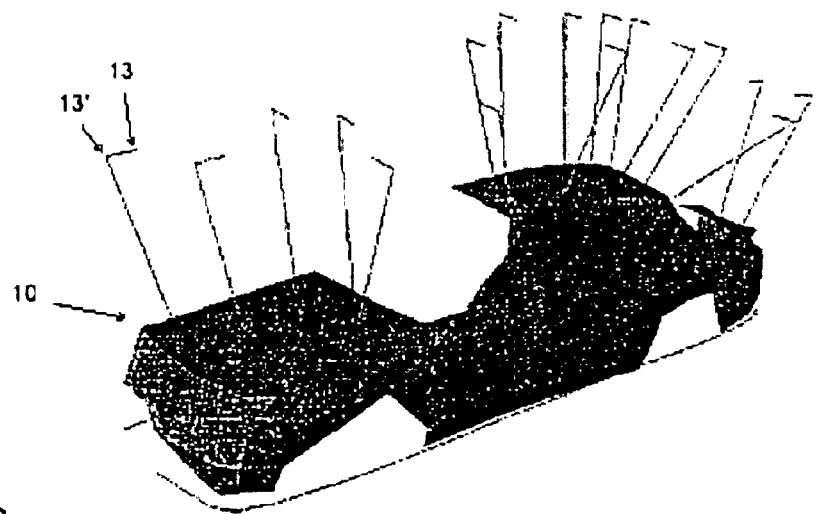
FIG. 3 shows the shifting of measuring positions. The ends of the "spines" indicate the shifted measuring position. The ends of the short lines facing away from the "spines" indicate the measuring positions which cannot be reached.

FIG. 3 shows a rough representation of the vehicle. On the floor, a polygon is drawn which represents a parallel projection of the vehicle into the x-y plane. The robot can only move outside this polygon. Only its horizontal arm with the measuring sensor can be situated above the vehicle, limited by its range. Therefore, it must be checked for each of the originally determined measuring positions whether they have to be shifted outward.

The shifting of the measuring position should bring about a minimum change in the measurement quality. Therefore, it is carried out horizontally, ensuring a nearly equal distance of the measuring sensor from the vehicle surface, and by a minimum amount.

The minimum required shift of the measuring position is determined as follows: First of all, the starting point of a first vector is determined by the parallel projection of the measuring position onto a horizontal plane (floor). The end point of this vector is determined by a point which is situated on the border of the parallel projection of the vehicle to be measured onto the horizontal plane and which has minimum distance from the starting point. One computes the direction and length of the so-defined vector.

If the length of this vector is greater than the maximum extension length of the robot arm, then the appertaining measuring position cannot be reached. Therefore, it has to be shifted outward and, to be more precise, in its horizontal plane in the direction of the vector and by the amount which is equal to the difference between the extension length and the length of the vector. The shifted measuring position 13', which has been shifted in this manner is, on one hand, just reachable by the robot arm and, on the other hand, only minimally shifted with respected to the unreachable measuring position 13.

For the determined measuring positions, a measuring track needs to be planned, i.e., a suitable sequence in which they can be approached by the robot.

The measuring position which lies closest to the original position of the measuring sensor is selected as the starting point of the measuring track.

Then, a fictitious auxiliary point P is computed as:

$$P = \frac{1}{N} \sum_{i=1}^{N} (c_i - rn_i)$$

where N is equal to the number of measuring positions, $c_i$ is the centroid of the $i^{th}$ surface triangle, $n_i$ is the normal vector of the $i^{th}$ surface triangle, r is a positive scalar.

The term $c_i-rn_i$ defines for each surface triangle a point which is situated at a distance r from centroid $c_i$ of the triangle in a direction parallel to the surface thereof. The point is situated behind the triangle inside or below the vehicle to be measured. The averaging of all these points yields auxiliary point P which is situated approximately centrally inside or below the vehicle to be measured.

Figure 4:
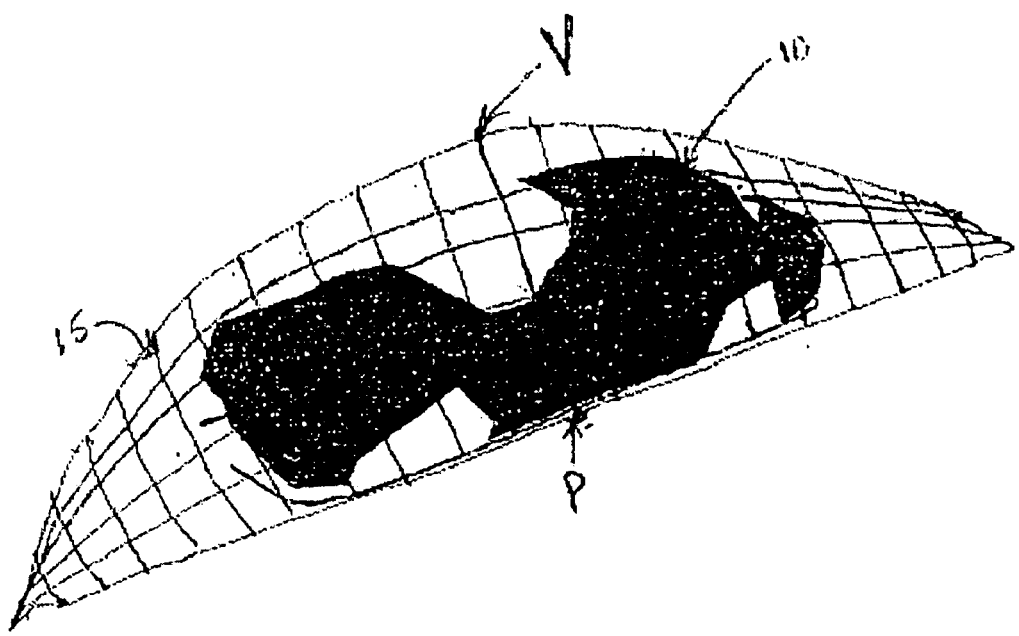
FIG. 4 shows a portion of a semi-elliptoid circumscribing the vehicle.
Figure 5:
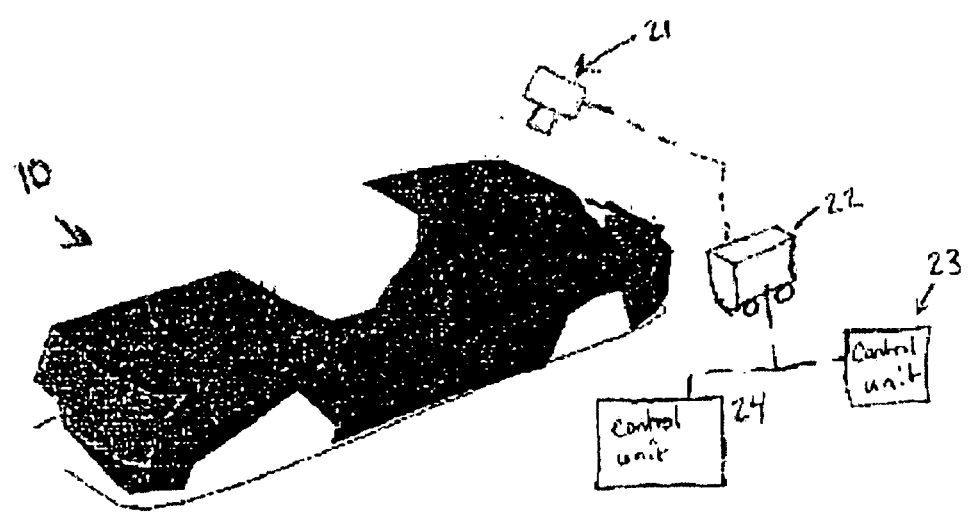
FIG. 5 shows an apparatus for performing measurements of a vehicle according to the present invention.

Beginning at the starting point, the measuring positions above the surface triangles are now arranged around this central point P in such a manner that the measuring track resulting from this arrangement runs around the vehicle in a meander form essentially on the surface of a fictitious semi-ellipsoid 15 which circumscribes the vehicle 10 to be measured and whose vertex V is located vertically above the auxiliary point P. See FIG. 4.

The measuring track runs on the surface of the fictitious semi-ellipsoid 15 only essentially and not really since the measuring positions 13 have a defined distance from the (representation of) the surface of the vehicle to be measured. Therefore, the measuring positions 13 (and thus, the appertaining part of the measuring track) can be situated both inside and outside the fictitious semi-ellipsoid 15. In reality, only the central projection of the measuring track which is related to the auxiliary point P runs on the surface of the fictitious semi-ellipsoid 15.

In the embodiments of the above described example, the methods and the device according to the present invention turn out to be particularly suitable for the simple and fast measurement of large objects such as vehicles.

The present invention is not limited to just the exemplary embodiment described above but rather is applicable to others. In this context, the methods and the device are essentially independent of the size of the objects to be measured. Very large objects can be measured in the pot same way as very small ones as long as suitable reference points are made available. With regard to the device, one just has to pay attention that all determined measuring positions can be reached.

In the first case, for example, when measuring a train, an aircraft or a vessel, this can be ensured by making available a robot having a sufficient range, in particular with respect to the height, for positioning the measuring sensor.

In the second case, that is, when measuring very small objects, the reference points can be made available, for example in a tactile manner in place of the photogrammetric position determination. In lieu of a robot, it offers itself to use an inexpensive rotary table for the positioning of the measuring sensor.

What is claimed is:

1. A method for performing measurements on an object, the method comprising:

providing a first representation of a surface of the object as a set of first reference points;

triangulating the reference points so as to create a plurality of surface triangles; and assigning a measuring position to each of the plurality of surface triangles, each measuring position being a defined distance from a centroid of each surface triangle in a direction normal to the surface triangle.

2. The method as recited in claim 1 further comprising:

measuring at least a portion of the object from a preselected measuring position so as to provide a refined representation of the object surface as a set of refined reference points;

creating a plurality of refined surface triangles; and assigning refined measuring positions based on the plurality of refined surface triangles.

3. The method as recited in claim 2 further comprising:

comparing a surface normal of each surface triangle to a surface normal of each respective refined surface triangle so as to determine a surface normal deviation value; and replacing each assigned measuring position with a respective assigned refined measuring position if the surface normal deviation value is greater than a predetermined value.

4. The method as recited in claim 1 wherein each if the plurality of surface triangles includes a normal vector having a direction and length and further comprising:

computing a refined measuring position derived from a group of neighboring measuring positions of the plurality of measuring positions; and replacing the group of neighboring measuring positions with the refined measuring position if:

a total area of the surface triangles appertaining to the group of neighboring measuring positions is less than a predetermined area value; and the direction of each of the normal vectors appertaining to the group of measuring positions does not differ by more than a predetermined angular deviation value.

5. The method as recited in claim 4 wherein the predetermined area value is predetermined as a function of a vision field of a measuring device used for measuring the object.

6. The method as recited in claim 4 wherein the predetermined angular deviation value is predetermined as a function of a desired measuring accuracy of a measuring device used for measuring the object.

7. The method as recited in claim 1 further comprising:

performing a parallel projection of each of the measuring positions onto a horizontal plane;

performing a parallel projection of the object onto the horizontal plane;

shifting each of the plurality of measuring positions horizontally and towards an outside of the object if the parallel projection of that measuring position lies within a border of the parallel projection of the object, and a distance between the parallel projection of that measuring position and the border exceeds a predetermined limiting value.

8. The method as recited in claim 7 wherein a first vector is computed having a direction and a length from a starting point, defined as the parallel projection of the measuring position onto the horizontal plane, to an end point, defined as a point situated on the border that is a minimum distance from the starting point, wherein a second vector has a same direction as the direction of the first vector and has a length equal to a difference between distance of the parallel projections and the length of the first vector, and wherein the shifting of each measuring position includes shifting each measuring position by the second vector.

9. The method as recited in claim 8 further comprising substituting each of the horizontally shifted measuring positions for a respective one of the plurality of measuring positions.

10. The method as recited in claim 1 wherein the first set of reference points is determined photogrammatically.

11. The method as recited in claim 10 wherein the first set of reference points is determined based on measuring marks placed on the object, the measuring marks being measured photogrammatically.

12. The method as recited in claim 1 further comprising performing measurements on the object using a measuring sensor from each of the measuring positions.

13. A method for planning measuring tracks for performing measurements on an object, the method comprising:

providing a set of measuring marks;

determining an auxiliary point situated below an outside surface of the object;

defining a semi-ellipsoid circumscribing the object and having a vertex vertically above the auxiliary point;

arranging a plurality of measuring positions around the auxiliary point and on the surface of the semi-ellipsoid so as to form a meander-shaped measuring track.

14. The method as recited in claim 13 further comprising:

determining a set of reference points from the set of measuring marks, and triangulating each of the reference points so as to create a plurality of surface triangles, and wherein the arranging steps includes assigning a measuring position to each of the plurality of surface triangles, each measuring position being a defined distance from a centroid of each surface triangle in a direction normal to the surface triangle.

15. The method as recited in claim 14 further comprising performing measurements using a measuring sensor from each of the plurality of measuring positions in the measuring track.

16. The method as recited in claim 13 wherein the determining of the auxiliary point includes computing the auxiliary point as:

$$P = \frac{1}{N} \sum_{i=1}^{N} (c_i - rn_i)$$

where N is equal to a total number of measuring positions,
$c_i$ is a centroid of an $i^{th}$ surface triangle,
$n_i$ is a normal vector of the $i^{th}$ surface triangle,
r is a positive scalar.

17. An apparatus for performing measurements on an object, the apparatus comprising:

a measuring sensor;

a device configured to determine a first representation of a surface of the object as a set of reference points, to triangulate the reference points so as to create a plurality of surface triangles, and to assign a measuring position to each surface triangle a defined distance from a centroid of the surface triangle and in a direction normal to the surface triangle; and a measuring sensor positioning device configured to position the measuring sensor at a plurality of measuring positions.

18. An apparatus for performing measurements on an object, the apparatus comprising:

a measuring sensor;

a measuring track planning device configured to determine an auxiliary point situated below an outside surface of the object using the set of measuring marks, to define a semi-ellipsoid circumscribing the object and having a vertex vertically above the auxiliary point, and to arranging a plurality of measuring positions around the auxiliary point and on the surface of the semi-ellipsoid so as to form a meander-shaped measuring track; and a measuring sensor positioning device configured to position the measuring sensor at the plurality of measuring positions along the measuring track.

* * * * *